United States Patent [19]

Yazima et al.

[11] Patent Number: 5,040,141

[45] Date of Patent: Aug. 13, 1991

[54] METHOD FOR ADMINISTRATING REPLY MAIL IN ELECTRONIC MAIL SYSTEM

[75] Inventors: Kazunori Yazima, Komae; Yasuhiko Mizuno, Kashiwa, both of Japan

[73] Assignee: Hitachi, Ltd., Tokyo, Japan

[21] Appl. No.: 123,930

[22] Filed: Nov. 23, 1987

[30] Foreign Application Priority Data

Nov. 25, 1986 [JP] Japan .................................. 61-280038

[51] Int. Cl.⁵ .............................................. G06F 13/10
[52] U.S. Cl. .................... 364/900; 364/919.5; 364/940.9; 364/937
[58] Field of Search ... 364/200 MS File, 900 MS File, 364/300; 379/89; 340/313, 825.06

[56] References Cited

U.S. PATENT DOCUMENTS

| | | | |
|---|---|---|---|
| 3,745,534 | 7/1973 | Frutiger et al. | 364/900 |
| 4,241,398 | 12/1980 | Carll | 364/200 |
| 4,281,315 | 7/1981 | Bauer et al. | 364/200 |
| 4,371,752 | 2/1983 | Matthews et al. | 379/89 |
| 4,405,951 | 9/1983 | Omori et al. | 364/900 |
| 4,476,349 | 10/1984 | Cottrell et al. | 379/216 |
| 4,602,129 | 7/1986 | Matthews et al. | 379/89 |
| 4,612,416 | 9/1986 | Emerson et al. | 379/89 |
| 4,646,300 | 2/1987 | Goodman et al. | 364/200 |
| 4,646,346 | 2/1987 | Emerson et al. | 379/89 |
| 4,713,780 | 12/1987 | Schultz et al. | 364/514 |
| 4,754,428 | 6/1988 | Schultz et al. | 364/900 |
| 4,785,473 | 11/1988 | Pfeiffer et al. | 379/89 |
| 4,805,207 | 2/1989 | McNutt et al. | 379/214 |

Primary Examiner—Michael R. Fleming
Assistant Examiner—Debra A. Chun
Attorney, Agent, or Firm—Fay, Sharpe, Beall, Fagan, Minnich & McKee

[57] ABSTRACT

In a mail message service system for delivering mail having mailboxes installed for respective users, an answer asking table is provided for storing information representative of whether an answer to a previously sent message is requested. Also stored in the answer asking table is the date and hour at which the query mail soliciting an answer to the previously sent message should be sent. The query mail soliciting an answer is sent on the basis of the stored information.

14 Claims, 7 Drawing Sheets

FIG. 2

| 20 MAIL ID | 21 MAIL NAME | 22 DELIVERY DATE AND HOUR | ~ | 23 ANSWER REQUEST | 24 ADDRESS | 25 ANSWER PRESENCE/ABSENCE | 26 ANSWER ASKING START DATE AND HOUR | 27 ANSWER ASKING INTERVAL | 28 NEXT ANSWER ASKING DATE AND HOUR | 29 ANSWER ASKING MAIL ID FIRST TIME | 29 SECOND TIME | 30 THE NUMBER OF ANSWER ASKING ATTEMPTS | 31 TERM. OF ANSWER ASKING |
|---|---|---|---|---|---|---|---|---|---|---|---|---|---|
| M0001 | MEETING A | SEPT. 2, 1986, 13 O'CLOCK | | PRESENCE | SHIMIZU | ABSENCE | SEPT. 17, 1986, 15 O'CLOCK | 1 HOUR | SEPT. 17, 1986, 16 O'CLOCK | M 1001 | | 1 | SEPT. 20, 1986, 15 O'CLCK |
| M0002 | MEETING B | SEPT. 15, 1986, 13 O'CLOCK | | ABSENCE | AOKI | | | | | | | | |

FIG. 3

SCREEN FOR MAKING ANSWER ASKING TABLE

| MAIL ID | MAIL NAME | ANSWER REQUEST | ANSWER PRESENCE/ABSENCE | START DATE AND HOUR | INTERVAL | MAIL NAME | | TERM |
|---|---|---|---|---|---|---|---|---|
| | | | | | | FIRST TIME | SECOND TIME | |
| M0001 | MEETING A | PRESENCE | ABSENCE | SEPT. 17 1986 15 O'CLOCK | 1 HOUR | ANSWER ASKING MAIL 1 | ——— | SEPT. 20 1986 15 O'CLOCK |
| M0002 | MEETING B | ABSENCE | | ——— O'CLOCK | ——— HOUR | ——— | ——— | ——— O'CLOCK |

FILL UP COLUMNS OF ——— AND SEND MAIL

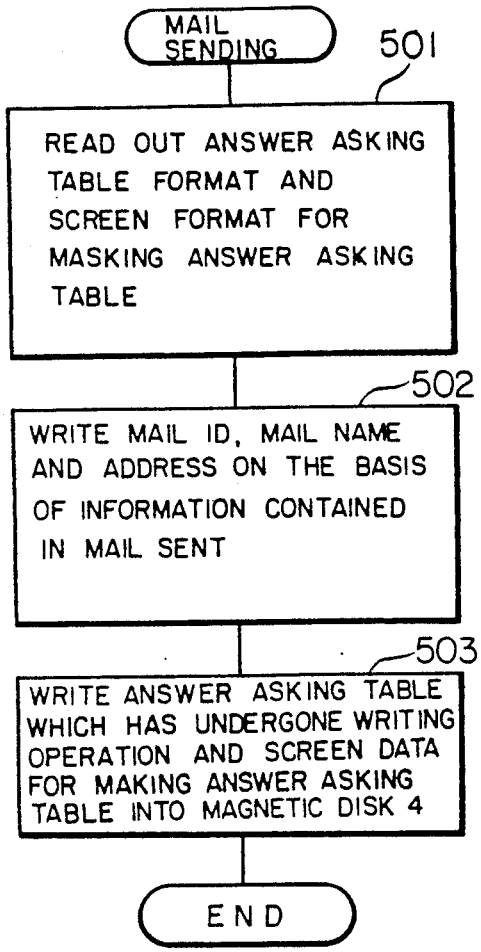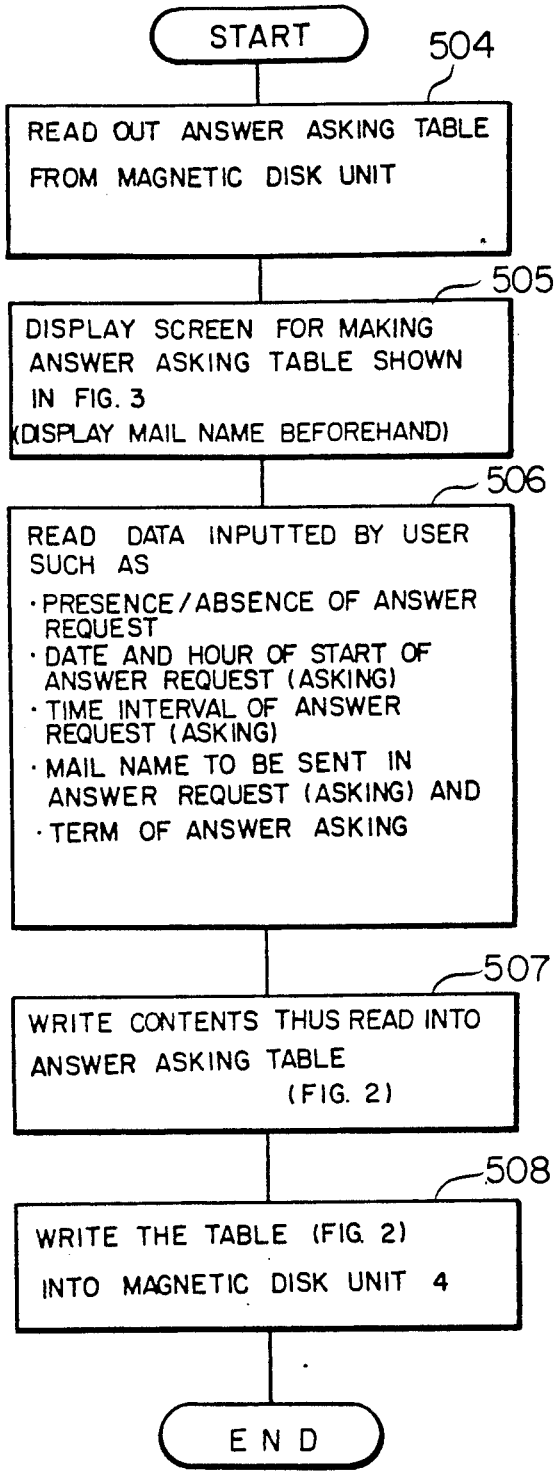

METHOD FOR ADMINISTRATING REPLY MAIL IN ELECTRONIC MAIL SYSTEM

BACKGROUND OF THE INVENTION

The present invention relates to a method for administrating answer mail obtained when mail requiring an answer is sent in a so-called electronic mail system in which communication sentences are exchanged between terminal units and a personal computer using a computer system.

In order to transmit information more smoothly or in order to prevent a user from temporarily interrupting the work due to information transmission as in the information transmission using telephone, electronic mail systems begin to be popularized. In such an electronic mail system, information of characters or voice is exchanged between terminals such as personal computers, telex or word processors via a computer network.

In those systems, a user can look at the list of mails delivered to the user. In some systems, the user can see the delivery situation of the mail sent by that user. Here the delivery situation means information representing whether the mail sent by the user has reached the destination or not, and whether the other party has read the mail or not.

The list display and the delivery situation display advantageously makes it possible to know the whole situation at a look to rapidly acquire important information or positively transmit important information. In case of the mail requesting an answer, however, it can be judged only by looking at the contents whether an answer is requested or not. In a system disclosed in JP-A-58-3445, for example, therefore, it is possible to display a list of the mail requesting answers together with the mail delivered to the user.

However, the above described prior art poses the following problems.

When the method of displaying the list of the mail requesting answers is used, the user who sends the mail requesting an answer can ask for an answer only by purposely making mail for asking for an answer and sending it or by telephoning. Therefore, there is a possibility that important information cannot be transmitted when the person who received the mail requesting an answer is absent or the person who sent the mail forgets to ask for an answer owing to pressure of work. In such a case, the person who received the mail requesting an answer cannot judge how important the answer is for the person who sent the mail requesting the answer because the answer is not asked for.

The prior art thus has a problem that it is impossible to prevent an incident that the person forgets to ask for an answer and hence the transmission of important information is delayed.

Further, the following technique is disclosed in JP-A-57-192153. At each of terminal units installed at a plurality of branch offices, the operator of the terminal unit writes the amount sold as a message at fixed time every day toward the mailbox of the host computer. The operator of a terminal unit installed at the head office reads out messages of respective branch offices from the mailbox and grasps the amount sold of the entire company. In accordance with function of such a system provided in consideration of a possibility that the message might not be written at fixed time, the situation of message writing completion at terminals commanded to write messages to the mailbox is examined, and an answer asking message prepared beforehand is automatically sent to a terminal where the writing operation has not yet performed.

This technique aims at examining whether a message has been written or not from a terminal specified beforehand. Accordingly, it was impossible to administrate information concerning whether the answer mail has reached or not when a plurality of mails having answer terms which are different each other are sent, and automatically ask for an answer provided that the answer has not reached yet.

SUMMARY OF THE INVENTION

An object of the present invention is to solve the above described problems of the prior art and provide an automatic answer asking scheme of an electronic mail system capable of automatically sending the mail asking for an answer for the mail requesting an answer and thereby preventing the delay of the information transmission.

In order to solve the above described problems, a system having mail administration means for delivering mail and mailboxes installed for respective users includes, in accordance with the present invention, an answer asking table for storing information representing whether an answer is requested or not and time when the mail asking for an answer should be sent, and an answer asking table registration means for registering the above described information into the above described answer asking table, a mail asking for an answer being sent on the basis of the above described registered information.

Since the present invention makes it possible to automatically send at appropriate time mail asking for an answer with respect to the mail already sent asking for an answer is performed positively. Since the attention of the person who received mail requesting an answer is newly aroused by the mail asking for an answer, the information transmission can be prevented from being delayed.

BRIEF DESCRIPTION OF THE DRAWINGS

FIG. 2 shows an example of an answer asking table.

FIG. 3 shows an example of a display screen used to make the answer asking table.

FIGS. 5a and 5b show a flow chart of an answer asking table registration section in the embodiment of the present invention.

DESCRIPTION OF THE PREFERRED EMBODIMENT

Figure 1:
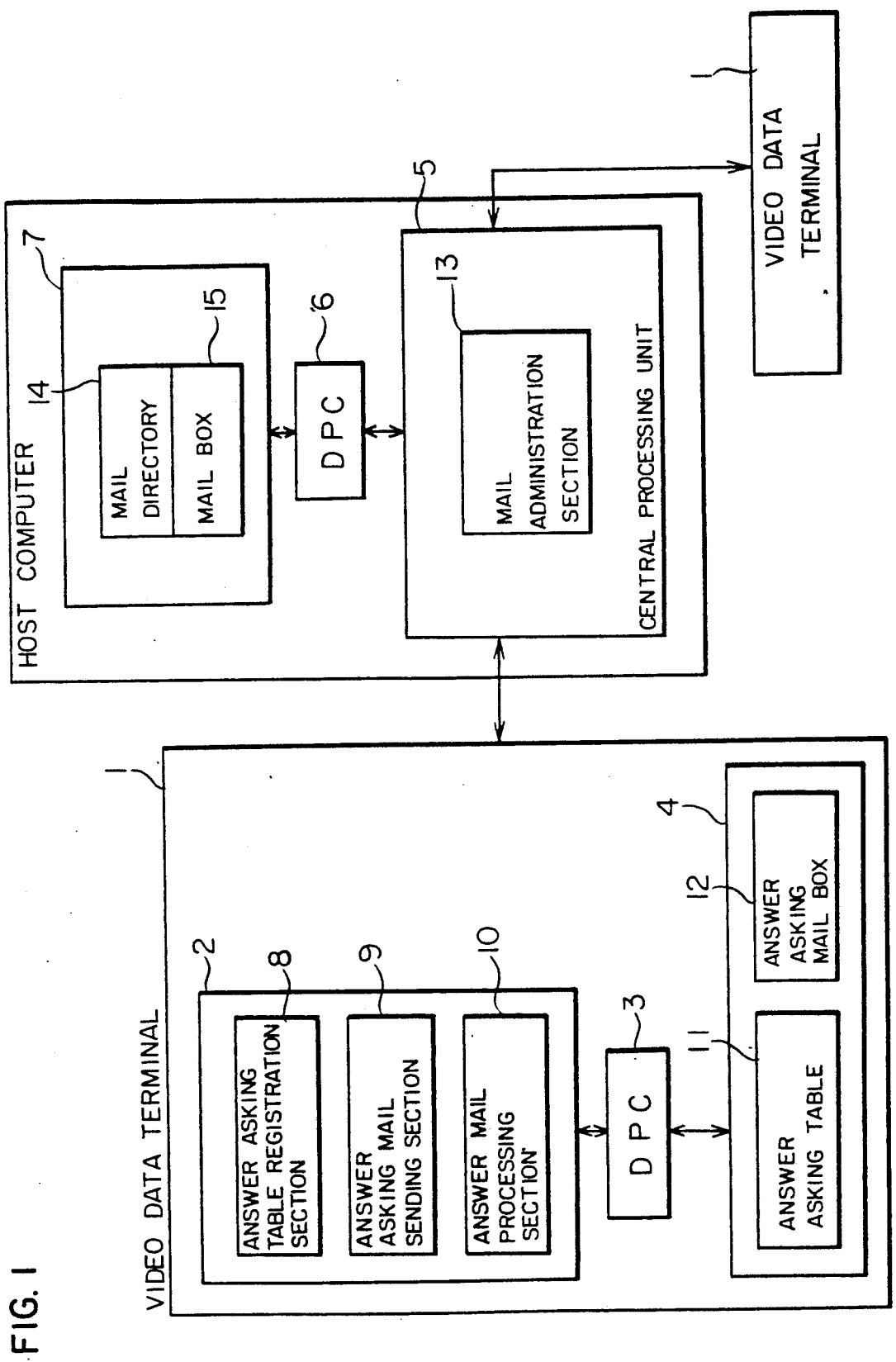
FIG. 1 is a configuration diagram of an electronic mail system showing an embodiment of the present invention.

FIG. 1 is a configuration diagram of an electronic mail system showing an embodiment of the present invention.

In FIG. 1, numeral 1 denotes a video data terminal, 2 a control unit of the video data terminal 1, 3 a magnetic disk control unit for performing various control functions of a magnetic disk unit described below, 4 a magnetic disk including an answer asking table 11 and an answer asking mailbox 12 containing the answer asking mail, 5 a central processing unit including a mail administration section 13, 6 a magnetic disk control unit for performing various control functions of a magnetic disk unit 7 described below, and numeral 7 denotes a magnetic disk unit including a mailbox 15 and a mail directory 14 for administrating a list of mail stored in the mailbox 15.

The control unit 2 includes an answer asking table registration section 8, an answer asking mail sending section 9 and an answer mail processing section 10. The answer asking mail sending section 9 looks at the answer asking table 11 and sends mail asking an answer. When an answer is obtained to electronic mail requesting an answer, the answer mail processing section 10 alters the answer presence/absence column of the answer asking table 11 and updates the answer asking table 11.

FIG. 2 shows an example of configuration of the answer asking table 11.

In FIG. 2, numeral 20 denotes a mail ID column for indicating a mail ID, and numeral 21 denotes a mail name column for indicating the name of the delivered mail. In this case, the mail notifies holding meeting A or B. And the name of the meeting is used as the mail name. Numeral 22 denotes a delivery date and hour column for indicating the date and hour of the delivery, 23 an answer request column for identifying whether the sent mail requests an answer or not, 25 an answer presence/ absence column for indicating whether an answer has been received or not, 26 an answer asking start date and hour column for indicating the hour at which the mail asking an answer is sent for the first time, 27 an answer asking interval column for indicating the time interval between answer asking mail sending times, 28 a next answer asking date and hour column for indicating the hour at which the answer asking mail should be succeedingly sent, 29 an answer asking mail ID column for indicating the identifying ID of the mail to be sent as answer asking mail stored in the answer asking mailbox 12, 30 a number of answer asking attempts column for indicating how many times answer asking mail has been sent until now, and numeral 31 denotes an answer asking term column for indicating the hour at which the last answer asking mail should be sent. If the answer asking mail ID column 29 is not filled up yet, the contents of the mail asking an answer are automatically made.

FIG. 3 shows an example of a screen used to make the answer asking table. In this example, the person who sends mail requesting an answer registers the answer asking table.

The person who sends the mail requesting an answer enters "presence" on the answer request column of the answer asking table registration screen shown in FIG. 3. (This screen is indicated on a display included in the video data terminal. However, this display is not illustrated.) Further, the person who sends the mail requesting an answer enters "SEPT. 17, 1986" on the start date and hour column, "1 hour" on the interval column, "answer asking mail 1" on the mail name column, and "SEPT. 20, 1986" on the term column. As a result, the answer asking table shown in FIG. 2 is made. Each item entered from the answer asking table registration screen by the person who sends the mail requesting an answer undergoes code conversion to be entered on each item of the answer asking table 11.

Figure 4:
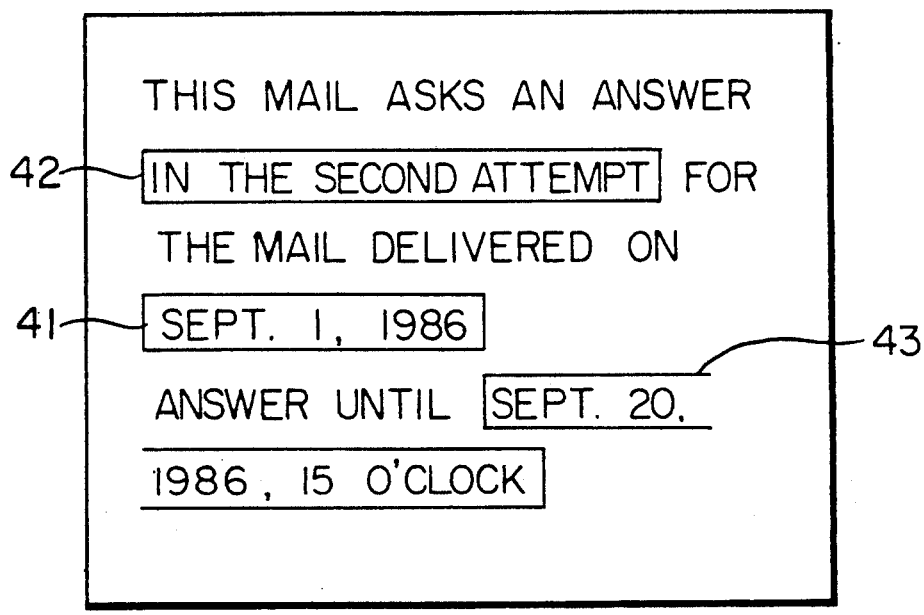
FIG. 4 shows an example of standard mail asking for an answer made and sent when the answer asking mail ID column of the answer asking table is not filled up yet.

FIG. 4 shows an example of mail asking an answer. Numerals 41, 42 and 43 denotes variable information columns. The block 41 is automatically made from the delivery date and hour entered on the delivery date and hour column of the answer asking table. The block 42 is automatically made by adding one to the value of the number of answer asking attempts column 30. And the block 43 is automatically made from the answer asking term column 31.

Details of the embodiment will now be described by referring to flow charts of FIGS. 5 to 7. FIGS. 5a and 5b show details of the answer asking table registration section 8. When the mail made at a terminal unit is sent to the host computer, processing shown in FIG. 5a is started.

First of all, the format of answer asking table and the screen format for making answer asking table, which are prepared beforehand and stored in the magnetic disk 4, are read out from the magnetic disk 4 (501). These formats do not have information written therein. On the basis of information contained in the mail sent from the terminal unit, the mail ID, the mail name and the address are written into the above described formats (502). The answer asking table which has thus undergone the writing operation and screen data for making answer asking table (data to be displayed on the screen for making answer asking table) are written into the magnetic disk 4 (503).

Processing shown in FIG. 5b is started when a terminal unit is commanded to registrate the answer asking table. First of all, the answer asking table 11 shown in FIG. 2 and stored in the magnetic disk 4 is read out to be stored into an internal memory of the control unit 2 (504). Succeedingly, the screen data for making answer asking table as shown in FIG. 3 are read out and indicated on the display (505). In accordance with the guidance displayed on this screen, the user inputs data such as the presence/absence of the answer request, the date and hour of the answer asking start, the answer asking interval, the name of the answer asking mail, the term of answer asking, and so on. These data are read into the internal memory (506). The contents thus read are written into the answer asking table 11 (507). And this table is written into the magnetic disk unit 4 (508).

Figure 6:
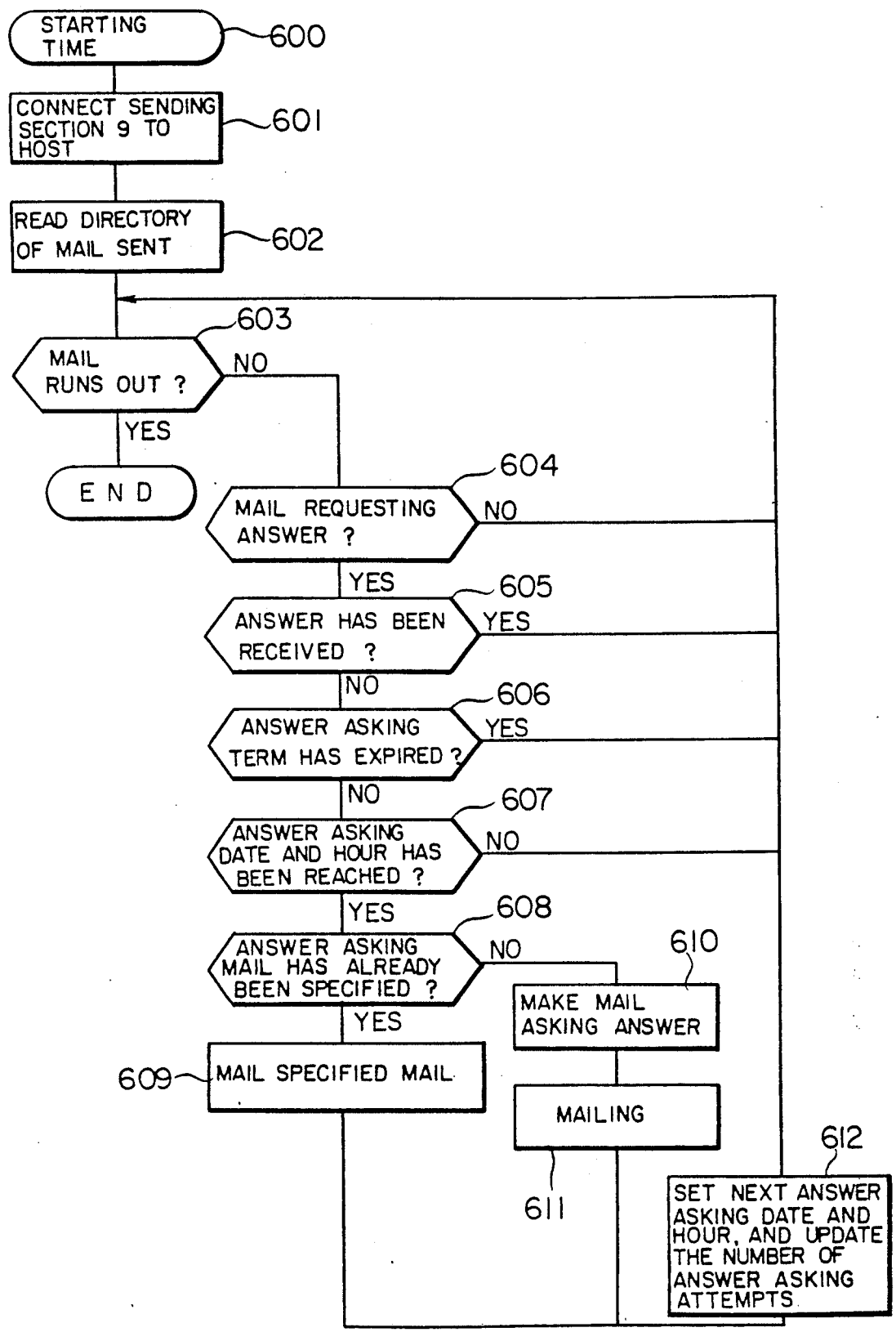
FIG. 6 is a flow chart of an answer asking mail sending section.

FIG. 6 shows processing performed in the answer asking mail sending section 9. This processing is started at fixed time intervals (600). The sending section 9 thus started is first connected to the host computer via a line (601). The mail directory 14 is read via the mail administration section 13, and the answer asking table 11 is read (602). With respect to each of the mail registered in the answer asking table 11, the following checks are then performed. That is to say, it is checked whether the mail registered in the table has run out or not (603). It mail registered in the table still remains, it is checked whether the mail requests an answer or not (604). It is then checked whether the answer has already been received or not (605). It is also checked whether the answer asking term has expired or not (606). Succeedingly, it is checked whether the answer asking date and hour has been reached or not (607). The checks at steps 603 to 607 are performed by referring to the answer request column 23, the answer presence/absence column 25, the answer asking term column 31 and the next answer asking date and hour column 28 shown in FIG. 2. When it has been determined that the mail asking an answer must be sent, it is checked whether the mail asking an answer is specified in the answer asking mail ID column 29 shown in FIG. 2 or not (608). If the mail asking an answer has already been specified, the specified mail is taken out from the answer asking mailbox 12 and mailed into the mailbox 15 through the mail administration section 13 (609). If the mail asking an answer is not specified, the mail is made as shown in FIG. 4 (610) and mailed into the mailbox 15 through the mail administration section 13 (611). After mailing, the next answer asking date and hour are derived on the basis of the answer asking interval and written into the column 28 of the answer asking table 11. And the number of answer asking attempts column 30 is updated.

Even if the person who sent the mail requesting an answer forgets to ask for an answer, the mail asking for an answer is automatically sent to the person who received the mail requesting an answer in the present embodiment. Accordingly, it is possible to prevent the occurrence of an omission of answer asking attempt. Further, the attention to the mail requesting an answer is newly aroused by sending the mail asking an answer to the person who received the mail requesting an answer. Since the mail made by the person who sent the mail requesting an answer can be sent as the mail asking for an answer, it is possible to alter the contents of the mail whenever an answer is asked so that the attention of the person who received the mail requesting an answer may be aroused more strongly.

In this way, it is possible to prevent the delay of the information transmission between the person who sent the mail requesting an answer and the person who received the mail requesting an answer by automatically sending the mail asking an answer.

Figure 7:
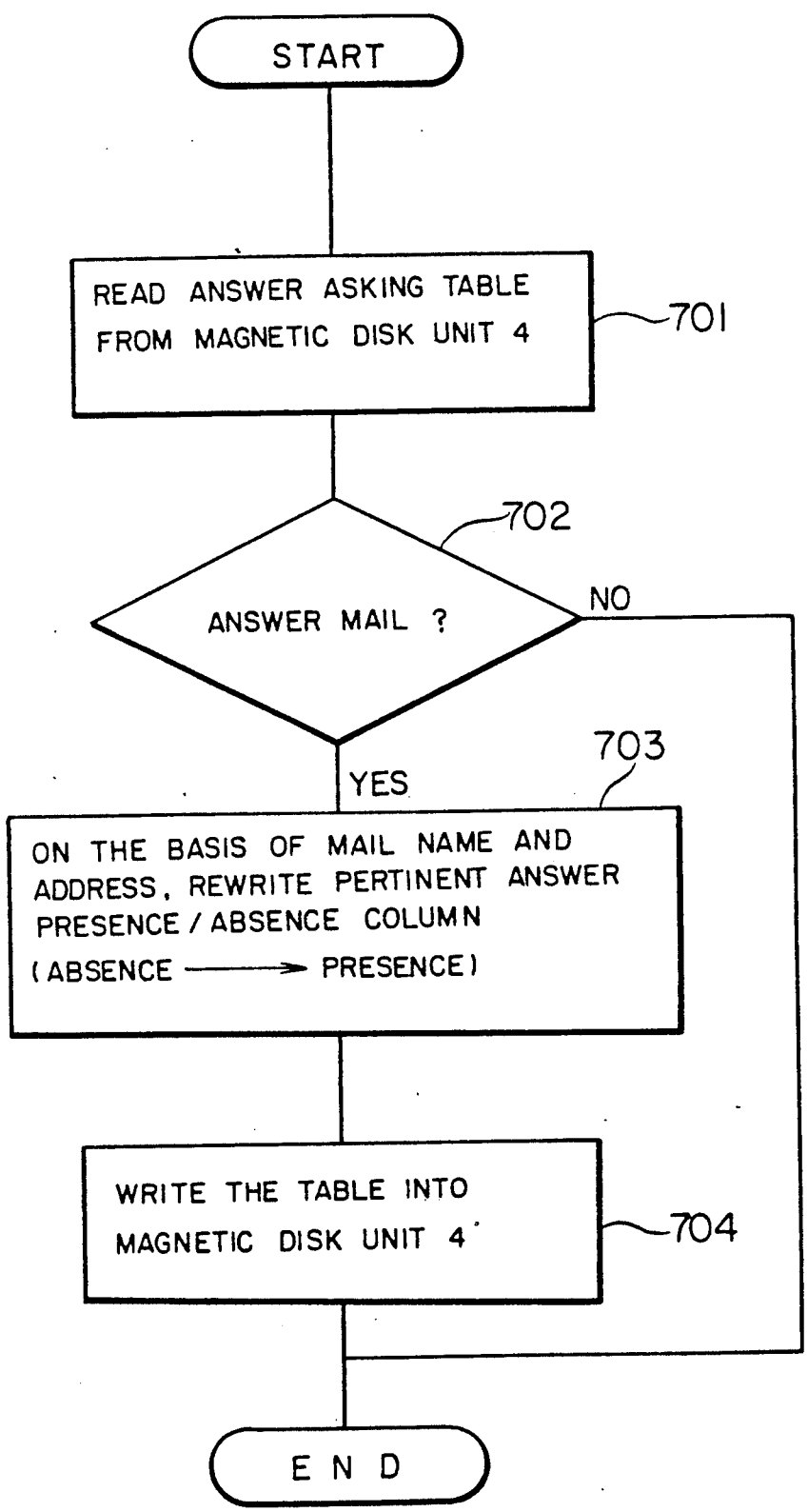
FIG. 7 is a flow chart of an answer mail processing section.

FIG. 7 shows details of the answer mail processing section 10. Upon receiving the mail, the section 10 is started, and the answer asking table 11 is read (701). The mail name of the answer mail is searched. (In case of an answer, the mail name is identical.) It is examined whether the identical mail name is present or not. It is thus judged whether the mail is an answer mail or not (702). If it is an answer mail, the contents of the answer presence/absence column 25 are rewritten so as to change from "absence" to "presence" (703). And the answer asking table 11 is written into the magnetic disk 4 (704).

In the above described embodiment, the answer asking table and the answer asking mailboxes are disposed in the video data terminal. Further, the answer asking table registration section, the answer asking mail sending section, and the answer mail processing section are also operated in the video data terminal. Even if either of these is disposed to operate in the central processing unit, however, it can be said that the configuration is one of embodiments according to the present invention.

In the above described example, the mail directory and the answer asking table are made and used separately. However, items of the answer asking table may be included in the mail directory as its items, and the mail directory may be used as the answer asking table.

In an electronic mail system according to the present invention as described above, the mail asking an answer is automatically sent for the mail requesting an answer. For the person who sent the mail requesting an answer, therefore, omission of an answer asking attempt is prevented. For the person who received the mail requesting an answer, the attention of the person is newly aroused. As a result, it is possible to prevent the delay in information transmission between the person who sent the mail requesting an answer and the person who received the mail requesting an answer.

We claim:

1. In an electronic mail system having a host computer, a plurality of terminal units between which mail is exchanged via said host computer, and a table for indicating mail messages requesting answers, a mail administration method comprising the steps of:

registering mail which requires an answer on said table with a terminal unit in response to sending of the mail which requires an answer to an associated solicited destination terminal unit;

writing answer presence information for indicating a reception of an answer into a location of said table corresponding to said sent mail which requires an answer when answer mail is received corresponding to the registered mail which requires an answer;

searching said table at a predetermined time for presence/absence of said answer presence information; and, sending a notice, to send back an answer responsive to said sent mail requiring an answer to the associated solicited destination terminal unit in the absence of the answer presence information.

2. The mail administration method according to claim 1, further comprising writing into the table a time designation at which an answer should be asked for the registered mail requiring an answer;

searching said table at said time designation written in said table;

examining said answer presence information for presence of an answer mail; and, sending an answer asking mail to the associated solicited destination terminal unit in an absence of an answer presence information, the answer asking mail effecting a follow-up solicitation of the mail which requires an answer.

3. The mail administration method according to claim 2, wherein the time designation writing step comprises:

writing to said table a first hour at which a first answer asking attempt, for first time polling of the associated solicited destination terminal unit, should be performed;

writing to said table information specifying an answer asking interval;

writing to said table a second hour at which a subsequent answer asking attempt, for second time polling the associated solicited destination terminal unit, is to be performed to said table, said second hour being calculated from the first hour of the first answer asking attempt and said information specifying an answer asking interval.

4. The mail administration method according to claim 1, wherein said table includes information specifying a number of answer asking attempts for said sent mail which requires an answer, and wherein the searching step further comprising sending answer asking mail repeatedly in accordance with each of the answer asking attempts.

5. An electronic mail system comprising a host computer connected to a plurality of terminal units between which mail messages are exchanged via said host computer;

a table means for indicating mail messages requesting answers;

writing means for writing answer presence information indicating a reception of an answer into a location of the table means corresponding to a mail message of said table in response to reception of an answer for said mail message; detecting means for detecting an absence of an answer message for said mail message at a predefined fixed time; and, sending means for sending a notice to said back an answer to associated destinations where said mail messages requesting answers were sent upon detecting the absence of the answer message for each of said mail messages requesting answers.

6. In an electronic mail system having a host computer and a plurality of terminal units, with mail being exchanged between said terminal units via said host computer, a mail administration method comprising the steps of:

a first step of determining, at least one of the plurality of terminal units, at fixed time intervals whether a mail requesting an answer has received an answer by examining a registration of answer presence/absence information for the mail requesting an answer; and, a second step of sending a notice to send back an answer to a destination terminal where said mail requesting an answer has been sent.

7. In an electronic mail system for exchanging mail messages between a plurality of terminal units via a host computer, an improved mail administration method performed by the plurality of terminal units, the improvement comprising the steps of:

storing status information into a status information location of an answer asking table upon sending each mail message, the status information representing the mail message sent and a response requirement condition, and the status information location being unique to the mail message sent;

writing answer presence information into the answer asking table upon receipt of answer mail, the answer mail containing an answer message responsive to an associated mail message responsive sent for which a response is expected, and the answer presence information being written into a predefined answer asking table location corresponding to the associated mail message;

searching the answer asking table for the answer presence information and the status information at predefined intervals of time; and, sending demand mail soliciting a responsive answer mail to a destination mailbox when the answer presence information is not found.

8. The improved mail administration method according to claim 7 further comprising the step of:

writing time information into a time data location of the answer asking table, the time data location being associated with said status information location in the answer asking table to pair the time information with the status information, and the time information being representative of a first selected time to send the demand mail.

9. The improved mail administration method according to claim 8 wherein the step of searching the answer asking table further comprises the substep of searching the answer asking table for the answer presence information at the first selected time to send the demand mail.

10. The improved mail administration method according to claim 9 wherein the step of writing time information comprises the substeps of:

writing an interval time value into an interval time value location of the answer asking table, the interval time value location being associated with said status information location of the answer asking table to logically pair the locations, and the interval time value being representative of a selected time interval between successive dispatches of the demand mail; and, writing an absolute time value into an absolute time value location of the answering table, the absolute time value location being associated with said interval time value location of the answer asking table to logically pair the locations and the absolute time value being representative of a time for a next attempted dispatch of the demand mail based upon the first selected time to send the demand mail and upon the interval time value.

11. The improved mail administration method according to claim 7 wherein the step of sending demand mail further comprises the step of sending one of a plurality of demand mail messages, stored in the answer asking table, based upon a count value stored in the answer asking table representative of a current number of attempts at sending demand mail without receiving a responsive answer mail.

12. The improved mail administration method according to claim 11 wherein the step of sending demand mail further comprises the step of creating a standard demand mail from the status information contained in the answer asking table, when no demand mail is specified in the answer asking table.

13. An improved electronic mail system for exchanging mail messages between terminal devices via a host computer common to and interposed between the terminal devices, the system comprising:

an answer asking table means for storing answer requested information indicative of a response required from the mail system for a mail message sent for which a return response is expected;

a writing means for writing answer presence information into the answer asking table, the answer presence information being representative of a receipt of a return response;

a detecting means for detecting, at selected intervals of time, the answer requested information stored in the answer asking table and the answer presence information stored in the answer asking table; and, mail sending means for sending mail from a first terminal device to a second terminal device via the host computer upon detecting an absence of the answer presence information and a presence of the answer requested information, the mail having a preselected message requesting a return response.

14. The improved electronic mail system of claim 13 further comprising:

a means for selecting an overall time interval within which the detecting means and the mail sending means operate;

a means for selected a start time, the start time being representative for an activation time of the detecting means and the mail sending means; and, a means for forming a generic mail message when the preselected message requesting a return response is not specified, the generic mail message being framed from the mail message sent for which a return response is expected.

* * * * *

UNITED STATES PATENT AND TRADEMARK OFFICE
CERTIFICATE OF CORRECTION

PATENT NO. : 5,040,141

DATED : August 13, 1991

INVENTOR(S) : Kazunori Yazima, et al.

It is certified that error appears in the above-identified patent and that said Letters Patent is hereby corrected as shown below:

Claim 7, column 7, line 43, delete "responsive" and insert therefor --previously--.

Claim 14, column 8, line 60, delete "selected" and insert therefor --selecting--.

Claim 14, column 8, line 66, delete "framed" and insert therefor --formed--.

Signed and Sealed this

Eighth Day of December, 1992

*Attest:*

DOUGLAS B. COMER

*Attesting Officer*     Acting Commissioner of Patents and Trademarks